United States Patent
Van Stensel et al.

(10) Patent No.: US 10,050,765 B2
(45) Date of Patent: Aug. 14, 2018

(54) PROVIDING AN INTERFACE FOR AN AVIONICS DATA TRANSFER SYSTEM

(71) Applicant: GE Aviation Systems LLC, Grand Rapids, MI (US)

(72) Inventors: Jonathan Paul Van Stensel, Grand Rapids, MI (US); Colin Holmwood, Ada, MI (US); Harry Molling, Kentwood, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 145 days.

(21) Appl. No.: 14/990,965

(22) Filed: Jan. 8, 2016

(65) Prior Publication Data

US 2017/0201367 A1    Jul. 13, 2017

(51) Int. Cl.
| | |
|---|---|
| *H04L 5/14* | (2006.01) |
| *G06F 3/06* | (2006.01) |
| *H04L 12/741* | (2013.01) |
| *H04L 29/08* | (2006.01) |

(Continued)

(52) U.S. Cl.
CPC .............. *H04L 5/14* (2013.01); *G06F 3/0607* (2013.01); *G06F 3/0635* (2013.01);
(Continued)

(58) Field of Classification Search
CPC ........ G06F 3/06; G06F 3/0607; G06F 3/0644; G06F 3/0635; H04L 12/741; H04L 29/06;
(Continued)

(56) References Cited

U.S. PATENT DOCUMENTS

| | | | |
|---|---|---|---|
| 7,929,431 B2 | 4/2011 | Wilt et al. | |
| 2008/0112439 A1* | 5/2008 | Vestal | H04J 3/0661 370/516 |

(Continued)

FOREIGN PATENT DOCUMENTS

| | | |
|---|---|---|
| EP | 2 466 476 A1 | 6/2012 |
| WO | 2015/062529 A1 | 5/2015 |

OTHER PUBLICATIONS

GE Fanuc Embedded Systems, "AFDX/ARIN C 664 Protocol" Tutorial. 2007.—24 pages.*

(Continued)

*Primary Examiner* — Charles C Jiang
*Assistant Examiner* — Kyaw Z Soe
(74) *Attorney, Agent, or Firm* — GE Aviation Systems LLC; William Andes

(57) ABSTRACT

Systems and methods for providing an efficient and configurable port interface in an avionics data transfer system are provided. For instance, in one embodiment a set of virtual ports associated with an avionics data transfer system can be defined. At least as a subset of the virtual ports can be mapped to one or more addresses in a memory space associated with the data transfer system, such that each virtual port has a fixed definition in the memory space. One or more of the virtual ports can then be associated with one or more physical ports associated with an interface between a host computing device and an end system in the data transfer system by specifying for the one or more virtual ports a plurality of port parameters that define the respective one or more physical ports.

20 Claims, 5 Drawing Sheets

(51) Int. Cl.
    *H04L 29/06*     (2006.01)
    *G06F 13/38*     (2006.01)
(52) U.S. Cl.
    CPC .......... *G06F 3/0644* (2013.01); *G06F 13/385* (2013.01); *H04L 45/74* (2013.01); *H04L 67/12* (2013.01); *H04L 69/16* (2013.01)
(58) Field of Classification Search
    CPC . H04L 29/08; H04L 5/14; H04L 69/16; H04L 67/12; H04L 45/74
    See application file for complete search history.

(56) References Cited

U.S. PATENT DOCUMENTS

| | | | |
|---|---|---|---|
| 2012/0027022 A1* | 2/2012 | Birkedahl | H04L 12/4641 370/401 |
| 2013/0208630 A1* | 8/2013 | Bobrek | H04L 67/12 370/276 |
| 2014/0161137 A1* | 6/2014 | Dasari | H04L 47/82 370/437 |
| 2015/0106473 A1 | 4/2015 | Bobrek | |
| 2015/0134855 A1 | 5/2015 | Sheffield | |
| 2015/0263975 A1* | 9/2015 | Srinivasan | H04L 47/6205 370/235 |

OTHER PUBLICATIONS

GE Fanuc Embedded Systems, "AFDX/ARINC 664 Protocol" Tutorial, 2007,—24 pages.
Extended European Search Report and Opinion issued in connection with corresponding EP Application No. 17150525.8 dated May 11, 2017.

* cited by examiner

PROVIDING AN INTERFACE FOR AN AVIONICS DATA TRANSFER SYSTEM

FIELD OF THE INVENTION

The present subject matter relates generally to avionics data transfer systems.

BACKGROUND OF THE INVENTION

Aircrafts and other vehicles may include a plurality of onboard computing systems that provide information to a user. For instance, an aircraft may include computing systems associated with autopilot, inertial platform, heads-up display, flight control, global positioning, tire pressure monitoring, and/or various other suitable applications. Transferring data between such onboard computing systems has become increasingly important in recent years. In particular, some control systems associated with an aircraft may rely on having complete and up-to-date data in a timely manner.

Conventional avionics data transfer systems may include one or more host computing devices communicating via one or more full-duplex Ethernet switches. For instance, the Avionics Full Duplex Switched Ethernet (AFDX) is a standard that defines electrical and protocol specifications (e.g., IEEE 802.3 and ARINC 664 part 7) for data exchange between avionics computing systems. Typical AFDX systems may include one or more avionics subsystems, an ADFX interconnect (e.g., one or more full-duplex, switched Ethernet switching devices) and one or more end systems configured to provide an interface between the avionics subsystems and the AFDX interconnect.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a method of configuring an avionics data transfer system associated with an aircraft. The method includes defining a set of virtual ports associated with an avionics data transfer system. The method further includes mapping at least a subset of virtual ports in the set of virtual ports to one or more addresses in a memory space associated with the avionics data transfer system, such that each virtual port is allocated to a fixed definition in the memory space associated with the avionics data transfer system. The method further includes associating one or more virtual ports of the at least a subset virtual ports with one or more physical ports associated with an interface between a host computing device and an end system in the avionics data transfer system by assigning to the one or more virtual ports a plurality of port parameters that define the respective one or more physical ports.

Another example aspect of the present disclosure is directed to an avionics data transfer system. The data transfer system includes one or more host computing devices configured to transmit and receive data packets over the avionics data transfer system. The data transfer system further includes one or more switching devices configured to receive one or more data packets from the one or more host computing devices and to transmit the data packets to an intended destination. The data transfer system further includes one or more end systems, each configured to provide a communications interface between a host computing device and at least one of the one or more switching devices. Each of the one or more end systems is further configured to establish a port interface between the end system and a host computing device by defining a set of virtual ports associated with the end system, mapping at least a subset of virtual ports in the set of virtual ports to one or more addresses in a memory space associated with the end system, such that each virtual port is allocated to a fixed definition in the memory space, and associating one or more virtual ports of the at least a subset of virtual ports with one or more physical ports associated with the interface between the host computing device and the end system by assigning to the one or more virtual ports a plurality of port parameters used to communicate with the respective one or more physical ports.

Yet another example aspect of the present disclosure is directed to an end system in an avionics data transfer system. The end system is configured to provide a communications interface between a host computing device and at least one switching device in the avionics data transfer system by defining a set of virtual ports associated with the end system, mapping at least a subset of virtual ports in the set of virtual ports to one or more addresses in a memory space associated with the end system, such that each virtual port is allocated to a fixed definition in the memory space, and associating one or more virtual ports of the at least a subset of virtual ports with one or more physical ports associated with the interface between the host computing device and the end system by specifying for the one or more virtual ports a plurality of port parameters used to communicate with the respective one or more physical ports.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
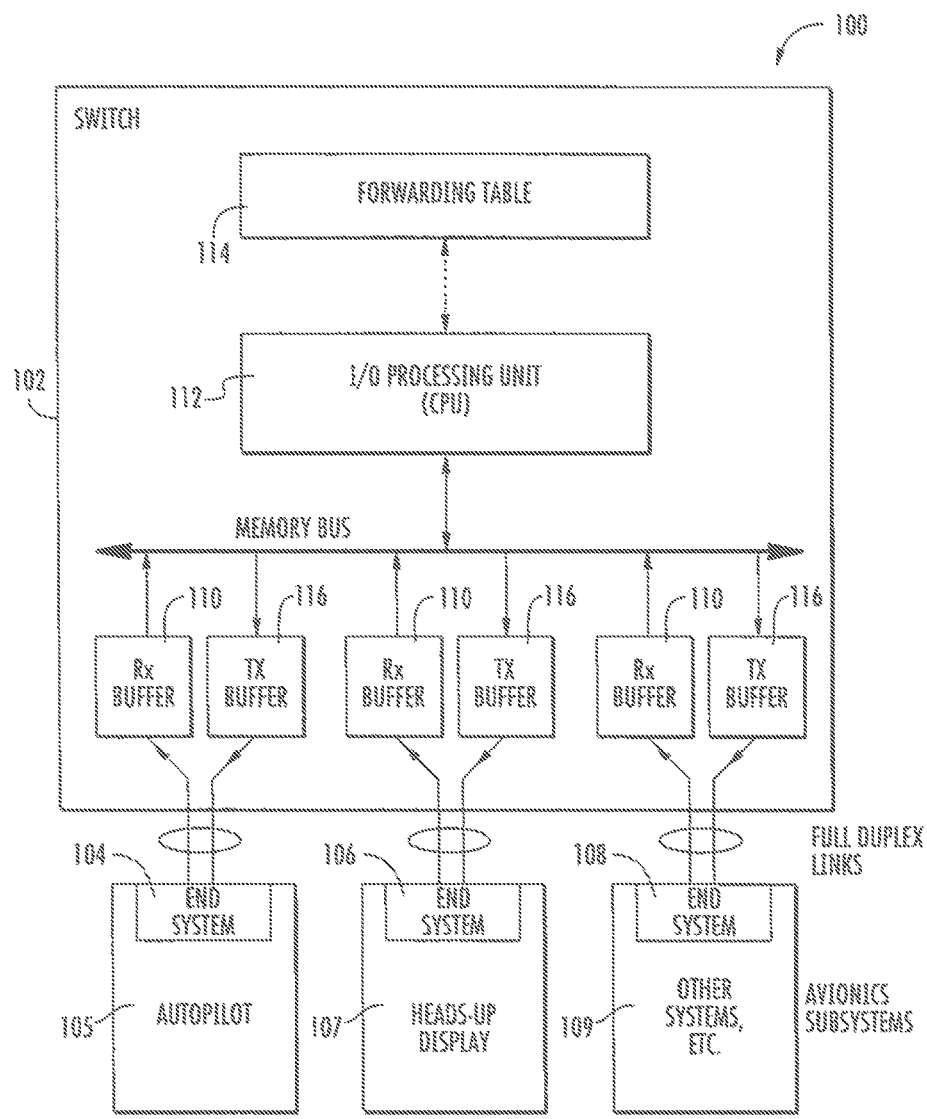
FIG. 1 depicts an example data transfer system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to providing an efficient interface for one or more ports of an end system in an avionics data transfer system. For instance, a set of memory mapped virtual ports can be defined for an end system in an avionics data transfer system. At least one virtual port in the set of virtual ports can be allocated to or otherwise associated with a physical port associated with an interface between the end system and a host computing device in the avionics data transfer system. For instance, in some implementations, each virtual port in the set of virtual ports can be allocated to a physical port. For instance, the virtual ports can be configured to associate the virtual port with one or more parameters that define the physical port. The virtual port can further be associated with one or more memory buffers and/or registers (e.g., control registers, status registers, time offset registers, error count registers, message registers, etc.) required for communication with the physical port.

The avionics data transfer system can be an avionics full-duplex switched Ethernet data network. In some implementations, each virtual port of the set of virtual ports can have a fixed definition in a memory space associated with the end system. The fixed definition in the memory space can specify one or more memory addresses associated with the virtual port. As indicated, one or more parameters can then be associated with the virtual port. For instance, the one or more parameters can define, at least in part, a physical port. In some implementations, the one or more parameters that define the physical port can include one or more virtual links, one or more sub-virtual links, a user datagram protocol (UDP) source port, a UDP destination port, a destination partition and/or various other suitable parameters associated with the physical port.

The host computing device can include one or more partitions. Each partition can be associated with an avionics subsystem in the data transfer system. Each avionics subsystem can be associated with one or more applications, such as autopilot, inertial platform, heads-up display, flight control, global positioning, tire pressure monitoring, and/or various other suitable applications. The partitions can provide isolation between the subsystems within the same host computing device. In some implementations, the isolation can be achieved by restricting the memory address space of each partition and by placing limits on the amount of processing time that is allotted to each partition. In this manner, a subsystem running in one partition on the host computing device will not affect subsystems running in the other partitions on the host computing device.

The applications associated with each partition can communicate with each other and/or with other subsystems associated with other host computing devices by sending messages using communication ports. In some implementations, each subsystem may determine such communication messages based at least in part on signals received from one or more controllers, sensors, actuators, etc. associated with the subsystem. Each communication port can be configured as a sampling port, a queuing port, or a service access point port. Each communication port can further be configured as a receive port or a transmit port.

As indicated above, a communication port can be allocated to a memory mapped virtual port by assigning one or more port parameters associated with the communication port to the virtual port. In some implementation, each communication port and/or associated virtual port can be associated with a single partition of the host computing device. In such implementations, a memory management unit (MMU) can be used to manage access by the partitions to the associated communication ports.

In some implementations, the virtual ports can be statically allocated by the MMU. For instance, the MMU can allocate the virtual ports using various suitable paging techniques (e.g., using 4 k page boundaries). In some implementations, the MMU can be used to translate one or more virtual memory addresses associated with the end system to one or more physical memory addresses. For instance, in some implementations, the MMU can map one or more contiguous virtual memory addresses to one or more noncontiguous physical memory spaces. In particular, by allocating the port interface contiguously, each partition can have protected access to the associated ports through use of the MMU. In this manner, each partition can have protected access to the partition's associated ports without requiring system calls to an operating system associated with the end system and/or the host computing device.

In some implementations, each virtual port can be individually addressable. For instance, as indicated above, each virtual port can include a unique set of buffers and registers necessary to interface with the associated physical port. In this manner, the virtual port can act as a "window" into the physical port. For instance, data can be written to a memory region associated with the virtual port and this data can then be associated with the physical port.

Each port can be managed on a virtual port basis. For instance, transmission ports can be managed on a virtual port basis. In this manner, the end system can manage the transmission of data using the transmission ports by providing a unique interface for one or more partitions associated with an end system. Similarly, received data can be mapped to a virtual receive port. The data can then be associated with the corresponding physical port based at least in part on the parameters specified by the virtual port. For instance, after the virtual ports have been initialized, the virtual ports can be used as a proxy for the corresponding physical ports.

With reference now to the figures, example aspects of the present disclosure will be discussed in more detail. For instance, FIG. 1 depicts an overview of an avionics full-duplex switched Ethernet data network 100 according to example embodiments of the present disclosure. Data network 100 includes a full-duplex switching device 102, end systems 104, 106, 108, and host computing devices 105, 107, 109. As shown, end systems 104, 106, 108 can provide an interface between host computing devices 105, 107, 109, and switching device 102. In this manner, host computing devices 105, 107, 109 may transmit data over the network (e.g., to switching device 102) using one or more communication ports associated with end systems 104, 106, 108. End systems 104, 106, 108 can transmit the data to switching device 102 via one or more full-duplex communication links. Switching device 102 can then route the data to one or more intended destinations. For instance, data received from host computing device 105 may be routed to host computing device 107, host computing device 109, or other computing device associated with the data network 100. In this manner, it will be appreciated that, although only three host computing devices are depicted in FIG. 1, switching device 102 may communicate with any suitable number of host computing devices without deviating from the scope of the present disclosure. It will be further appreciated that, although only one switching device 102 is depicted, data network 100 may include any suitable number of switching devices without deviating from the scope of the present disclosure.

Each host computing device may be associated with one or more applications. For instance, as shown, host computing device 105 is associated with an autopilot application and host computing device 107 is associated with a heads-up display application. Host computing device 109 can be associated with various other systems and/or applications.

Host computing devices 105, 107, 109 can determine one or more data messages and can transmit the data messages to switch device 102 through the corresponding end systems 104, 106, 108. For instance, as indicated the data messages may be transmitted to switching device 102 through a full-duplex link, such as two category 5 UTP twisted pairs. The data messages can be received by switching device 102 through receive buffers 110. In some implementations, receive buffers 110 can store multiple data packets in first-in, first-out (FIFO) order. The data packets can be provided to an I/O processing unit 112 via a memory bus.

In some implementations processing unit 112 can be configured to analyze each packet stored in receive buffers 110 and to determine a destination address for the packets. For instance, in implementations, wherein the receive buffers 110 are FIFO buffers, processing unit 112 can analyze each arriving packet based at least in part on the order of arrival of the packets. In some implementations, processing unit 112 can determine the destination address for the packets based at least in part on a virtual link identifier (VLID) encoded in the packet. The VLID can be indicative of a source end system and one or more destination end systems associated with the data packets.

Once the VLID for a packet is determined, the packet can be provided to a forwarding table 114. Forwarding table 114 can indicate one or more transmit buffers 116 to which the packet should be sent. For instance, forwarding table 114 can provide a mapping of VLIDs to transmission buffers 116 and/or destination end systems. The packet can then be copied to the appropriate transmission buffer(s) through the memory bus, and transmitted on an outgoing link associated with the transmission buffer. For instance, the outgoing link may link the switch to an end system or to another switching device. Similar to receive buffers 110, in some implementations, transmission buffers 116 can be FIFO buffers. In such implementations, the data packets can be transmitted by the transmission buffers 116 based at least in part on the order of arrival at the transmission buffers.

Figure 2:
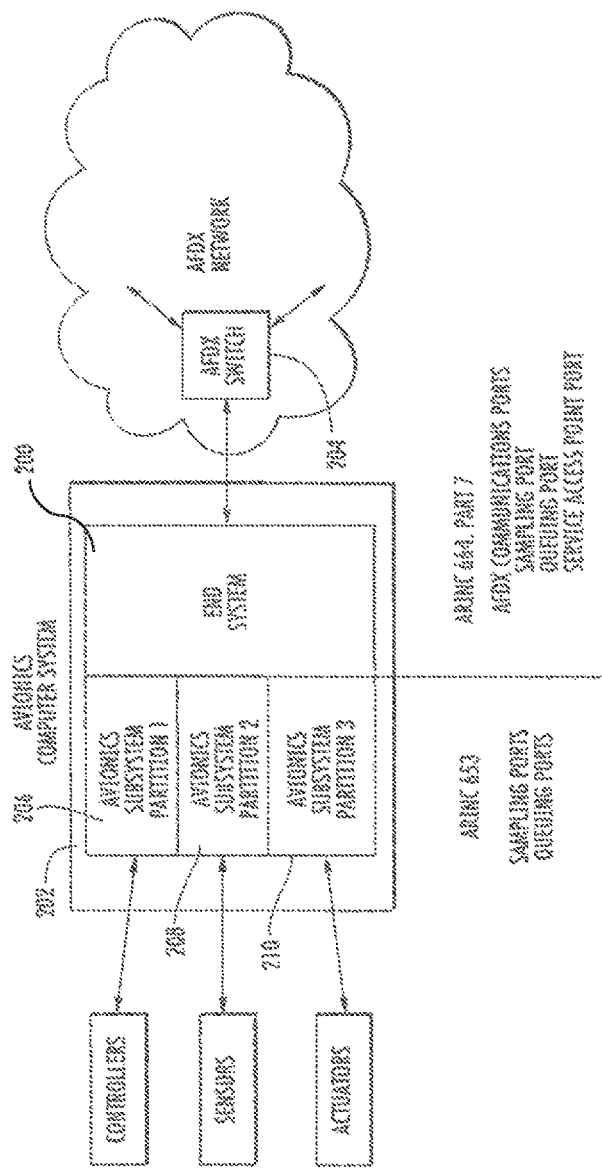
FIG. 2 depicts an example avionics computing system according to example embodiments of the present disclosure.

As described above, in some implementations, a host computing device 105, 107, 109 may be associated with multiple applications. For instance, a host computing device 105, 107, 109 may include two or more subsystems. Each subsystem can be associated with an independent application. In some implementations, the subsystems can be implemented as partitions of the host computing device. For instance, FIG. 2 depicts an end system 200 interfacing with a host computing device 202 that includes three independent partitions.

As indicated, end system 200 can provide a connection between host computing device 202 and a switching device 204. Switching device 204 can correspond to switching device 102 of FIG. 1 or other switching device. Host computing device 202 supports subsystems 206, 208, 210. As indicated, subsystems 206, 208, and 210 can be implemented as partitions 1, 2, and 3, respectively. Partitions 1-3 can provide isolation between subsystems 206-210 within host computing device 202. For instance, the isolation can be achieved by restricting the address space of each partition. The isolation can further be achieved by restricting the time allotted to each partition. In this manner, partitions 1-3 can correspond to spatial partitions and/or temporal partitions.

As shown, partitions 1-3 may be configured to receive one or more signals from one or more controllers, sensors, and/or actuators. Partitions 1-3 may further be configured to determine one or more data messages based at least in part on such signals, and to provide the data messages to one or more other computing devices over the data network. As described above, such data messages may be transmitted or received through communication ports associated with one or more end systems and/or switching devices in a data network.

Figure 3:
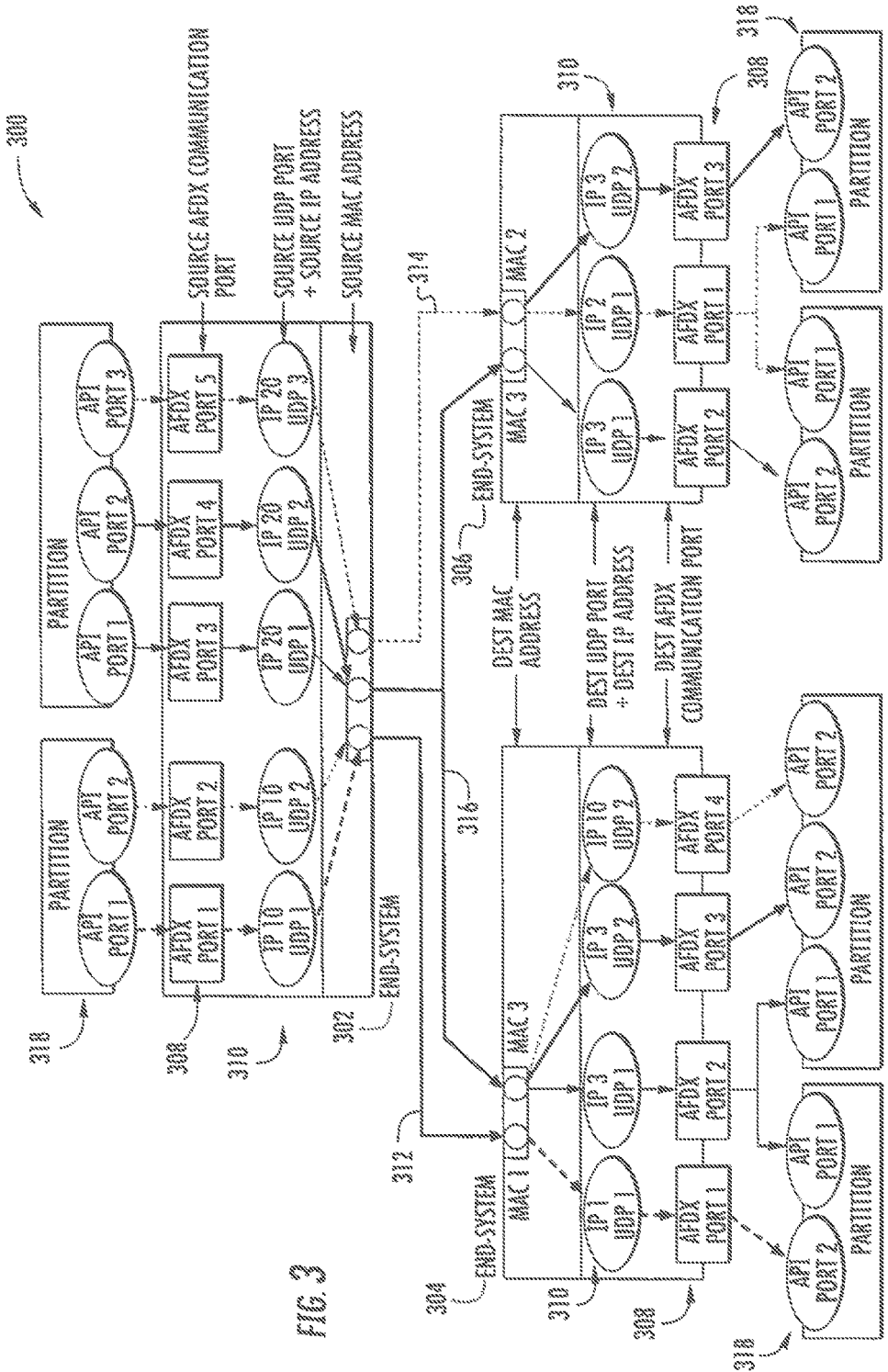
FIG. 3 depicts example port configurations in a data transfer system according to example embodiments of the present disclosure.

For instance, FIG. 3 depicts port configurations of end systems 302, 304, 306 in a data network 300. For instance, each end system 302, 304, 306 includes communication ports 308, and UDP ports 310. Data network 300 further includes virtual links 312, 314, and 316. As shown, virtual links 312, 314, 316 provide a link from end system 302 to end system 304 and/or end system 306. It will be appreciated that data network 300 can include any suitable number of virtual links between end systems 302, 304, 306. It will be appreciated that, although no switching device is depicted in FIG. 3, virtual links 312, 314, 316 may be routed through one or more switching devices, such as switching device 102, or switching device 204.

End systems 302, 304, 306 can interface with one or more partitions associated with a host computing device. As shown each partition may include one or more API ports 318. Each API port 318 may correspond to a communication port 308. Each communication port 308 may further correspond to a UDP port 310. In some implementations, each partition can have one source IP address and one destination IP address associated with each communication port. In this manner, a partition can have multiple IP addresses corresponding to multiple communication ports. In some implementations, an AFDX message can be identified by its associated UDP source and destination port numbers, its IP source and destination addresses as well as its MAC destination address which encodes the VL.

In some implementations, each communication port can be configured as a sampling port, a queuing port, or a service access point (SAP) port. For instance, each partition can be configured operate in accordance with the ARINC-653 protocol. ARINC-653 defines sampling and queuing ports. End systems 302, 304, 306 can be configured to provide a suitable communications interface for supporting sampling and queuing ports. For instance, end systems 302, 304, 306 can operate in accordance with the ARINC-664 protocol (Part 7). ARINC-664 defines sampling and queuing ports to correspond to the ARINC-653 sampling and queuing ports, respectively. ARINC-664 further provides SAP ports that can be used for communication between components in the avionics full-duplex switched Ethernet (AFDX) data network and non-AFDX components.

A sampling port can include buffer storage for a single message. In this manner, arriving messages may overwrite a message currently stored in the buffer. Reading a message from a sampling port does not remove the message from the buffer. In this manner, a message stored in the sampling port can be read multiple times. A queuing port can include sufficient storage for multiple messages. For instance, the number of messages that the queuing port is capable of storing can be specified as a configuration parameter. New messages can be appended to the buffer queue. Reading from a queuing port removes the message from the queue (e.g., on a FIFO basis).

Figure 4:
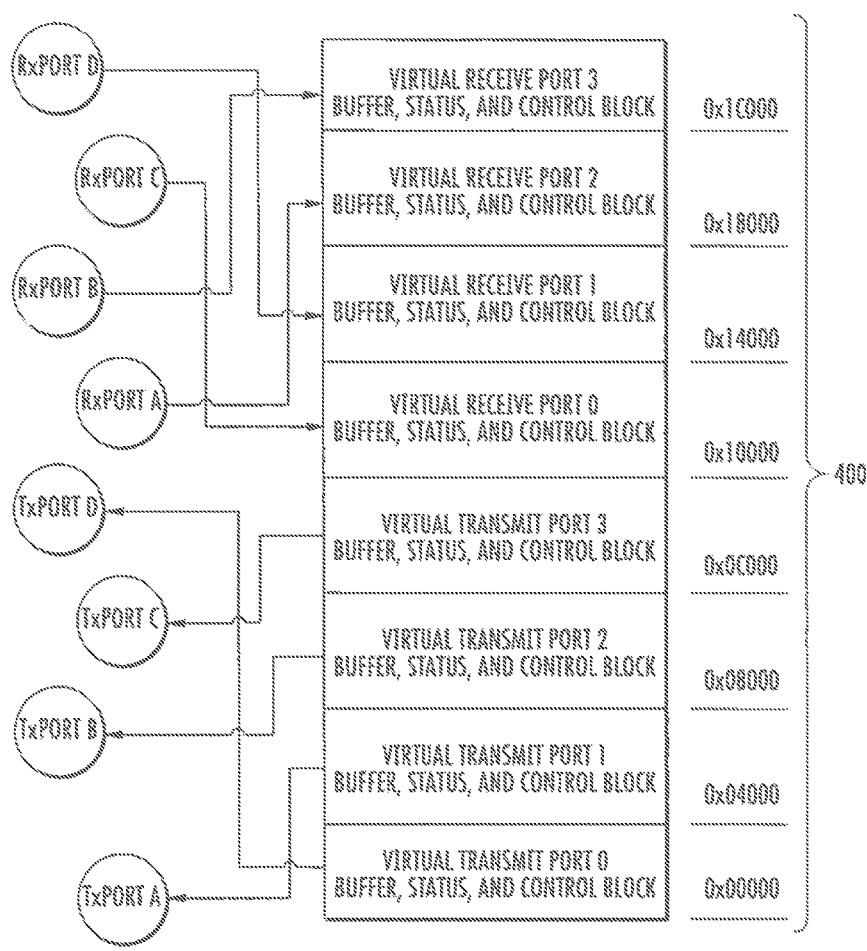
FIG. 4 depicts an example virtual port configuration in a data transfer system according to example embodiments of the present disclosure.

As described above, one or more virtual ports may be defined and associated with one or more communication ports of an end system. For instance, FIG. 4 depicts a set of virtual ports according to example embodiments of the present disclosure. In particular, FIG. 4 depicts receive (Rx) ports A, B, C, D, and transmit (Tx) ports A, B, C, D. As shown, each port has a corresponding virtual port. For instance, virtual receive port 0 corresponds to Rx port C, virtual receive port 1 corresponds to Rx port D, etc.

In this manner, the set of virtual ports can be defined and memory mapped to one or more memory addresses 400 in a memory space associated with the end system. In this manner, each virtual port in the set of virtual ports may be configured to have a fixed definition in the memory map associated with the end system. The virtual ports can be configured individually and assigned specific port parameters. Each virtual port can further be associated with a unique set of buffers and/or registers necessary for communication with the corresponding Rx or Tx port.

Each memory mapped virtual port can be accessed independently. In this manner, the virtual ports can act as a "window" into the Rx and Tx ports. The parameters associated with a virtual port can define the corresponding Rx or Tx port associated with virtual port. For instance, the port parameters can include parameters indicative of a virtual link, a sub-virtual link, a UDP source port, a UDP destination port, a destination partition, etc.

Creating and allocating the virtual ports can simplify the interface between the end system and the host computing device. As described above, each Tx or Rx port can be associated with a subsystem partition associated with the host computing device. In some implementations, each virtual port can be allocated to a contiguous address space using a memory management unit (MMU). In this manner, each partition can have protected access to its associated ports through use of the MMU without requiring a system call to the operating system associated with the end system and/or host computing device.

The Tx and Rx ports can be managed on a virtual port basis. For instance, for transmission by a Tx port, the end system may assign a port identifier to the message at transmission of the message based at least in part on the corresponding virtual port. As another example, for reception by an Rx port, each received message can be mapped to the virtual port. In this manner, the message can be associated with the virtual port.

Figure 5:
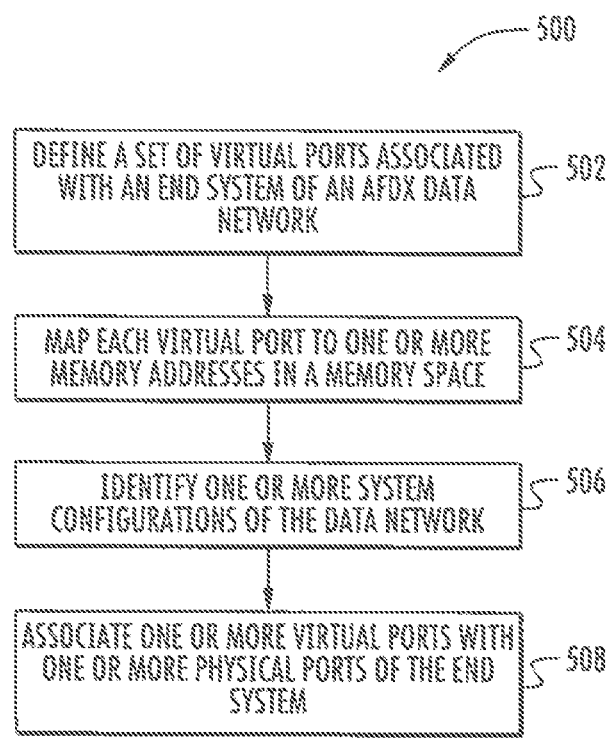
FIG. 5 depicts a flow diagram of an example method of configuring a port interface in an avionics data transfer system according to example embodiments of the present disclosure.

FIG. 5 depicts a flow diagram of an example method (500) of providing a virtual port interface for an end system of an avionics data transfer system according to example embodiments of the present disclosure. The method (500) can be implemented using one or more computing devices, such as one or more of the computing devices of FIGS. 1 and 2. The method or portions of the method can be implemented at least in part by other devices or components without deviating from the scope of the present disclosure. In addition, FIG. 5 depicts steps performed in a particular order for purposes of illustration and discussion. Those of ordinary skill in the art, using the disclosures provided herein, will understand that various steps of any of the methods disclosed herein can be modified, rearranged, omitted, expanded, and/or adapted in various ways without deviating from the scope of the present disclosure.

At (502), method (500) can include defining a set of virtual ports associated with an end system of an avionics full-duplex switched Ethernet (AFDX) data network. As described above, the AFDX data network may include one or more host computing devices and one or more switching devices. The data network can further include one or more end systems configured to provide an interface between the host device(s) and the switching device(s). In particular, the host device(s) can be configured to communicate with the switching device(s) through one or more communication ports associated with the end system(s).

The set of virtual ports can include any suitable number of virtual ports. For instance, in some implementations, the number of virtual ports can be determined based at least in part on one or more system configurations of the data network and/or on an amount of available memory space in the end system. In some implementations, a fixed number of virtual ports can be specified for an end system. The virtual ports may then be enabled or disabled based at least in part on one or more system requirements.

At (504), method (500) can include mapping each virtual port to one or more memory addressees in a memory space associated with the end system. In particular, mapping each virtual port to one or more memory addresses in the memory space can include allocating or assigning each virtual port in the set of virtual ports a fixed definition in the memory space. In some implementations, a subset of the virtual ports can be mapped to the memory space. For instance, the virtual ports may be mapped to the memory space based at least in part on one or more port configurations associated with the end system. In some implementations, the amount of allotted memory space can be determined based at least in part on the size of data messages to be communicated through the data network. For instance, the size of the memory space can be fixed to allow the largest message size (e.g., 8 kilobytes) along with any necessary registers.

At (506), method (500) can include identifying one or more system configurations associated with the data network. For instance, the system configurations can include a number of host computing devices, switching devices, end systems, partitions, etc., to be implemented in the data network. The system configurations can further include a number of physical ports that are implemented in the end system, and/or a number of ports that will be enabled to communicate with switching device(s) and/or host computing device(s). In this manner, the set of virtual ports can be tailored to the system requirements and/or characteristics of the data network.

At (508), method (500) can include associating one or more virtual ports in the set of virtual ports with one or more physical ports of the end system based at least in part on the one or more system configurations. For instance, the virtual ports can be associated with one or more physical ports that will be implemented within the data network as indicated by the one or more system configurations. In particular, associating one or more virtual ports with one or more physical ports can include specifying, assigning or otherwise allocating one or more port parameters defining the corresponding physical ports to the virtual ports. As described above, the port parameters can include virtual link parameters, sub-virtual link parameters, a UDP source port, a UDP destination port, a destination partition, etc. In this manner, the parameters of the physical port can be associated with the corresponding memory mapped virtual port.

The one or more virtual ports may further be configured to be associated with one or more buffers and/or registers used by the physical ports. For instance, a virtual port may be associated with each buffer and/or register required for interfacing with the corresponding physical port. In this manner, the one or more virtual ports may be assigned or allocated one or more buffers and/or registers and can act as an independent window or proxy for the physical port.

In some implementations, the virtual ports can be allocated contiguously using an MMU. In this manner, each partition associated with the physical port can have unprotected access to the corresponding virtual ports (e.g., and thereby with the corresponding physical ports) through the MMU without needing the port access to be managed by the operating system.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of providing a virtual port interface for an end system in an avionics data transfer system associated with an aircraft and including at least one end system having one or more communication ports associated therewith, the method comprising:
    defining a set of virtual ports for the at least one end system of the avionics data transfer system wherein each virtual port of the set of virtual ports is associated with a corresponding communication port of the one or more communication ports;
    mapping at least a subset of virtual ports in the set of virtual ports to a fixed definition in a memory space associated with the at least one end system of the avionics data transfer system, such that the fixed definition in the memory space specifies one or more memory addresses associated with each virtual port of the subset of virtual ports;
    associating one or more virtual ports of the at least a subset of virtual ports with one or more physical ports associated with an interface between a host computing device and an end system in the avionics data transfer system by assigning to the one or more virtual ports a plurality of port parameters that define the respective one or more physical ports; and
    managing, via the one or more virtual ports, the one or more physical ports by mapping each message to be transmitted and received via the one or more physical ports, at the transmission thereof to each virtual port via the at least one end system.

2. The method of claim 1, wherein associating one or more virtual ports of the at least a subset of virtual ports with one or more physical ports comprises associating the one or more virtual ports with one or more memory buffers or memory registers associated with the respective one or more physical ports.

3. The method of claim 1, wherein the avionics data transfer system comprises an avionics full-duplex switched Ethernet data network, and wherein the at least one end system provides a communications interface between the host computing device and a switching device associated with the avionics full-duplex switched Ethernet data network.

4. The method of claim 1, wherein the plurality of parameters that define the respective one or more physical ports comprise parameters associated with a virtual link, a sub-virtual link, a UDP source port, a UDP destination port, or a destination partition.

5. The method of claim 1, wherein each virtual port of the set of virtual ports is individually addressable.

6. The method of claim 1, wherein each virtual port of the at least a subset of virtual ports is allocated to a contiguous address space.

7. The method of claim 6, wherein each virtual port of the at least a subset of virtual ports is allocated using a memory management unit.

8. The method of claim 7, wherein the host computing device comprises at least two partitions, each partition associated with an independent application associated with the avionics data transfer system.

9. The method of claim 8, wherein each partition is associated with at least one of the one or more physical ports.

10. The method of claim 9, wherein the memory management unit manages access by each partition to the at least one of the one or more physical ports associated with the partition.

11. The method of claim 1, further comprising identifying one or more system configurations associated with the data transfer system, and wherein associating one or more virtual ports of the at least a subset of virtual ports with one or more physical ports comprises associating one or more virtual ports of the at least a subset of virtual ports with one or more physical ports based at least in part on the one or more system configurations.

12. An avionics data transfer system comprising:
    one or more host computing devices configured to transmit and receive data packets over the avionics data transfer system;
    one or more switching devices configured to receive one or more data packets from the one or more host computing devices and to transmit the data packets to an intended destination; and
    one or more end systems, each comprising one or more communication ports, and configured to provide a communications interface between a host computing device and at least one of the one or more switching devices, each of the one or more end systems further configured to establish a port interface between the end system and a host computing device by:
        defining a set of virtual ports for the end system wherein each virtual port of the set of virtual ports is associated with a corresponding communication port of the one or more communication ports;
        mapping at least a subset of virtual ports in the set of virtual ports to a fixed definition in a memory space associated with the end system, such the fixed definition in the memory space specifies one or more memory addresses associated with each virtual port of the subset of virtual ports;

associating one or more virtual ports of the at least a subset of virtual ports with one or more physical ports associated with the interface between the host computing device and the end system by assigning to the one or more virtual ports a plurality of port parameters used to communicate with the respective one or more physical ports; and managing, via the one or more virtual ports, the one or more physical ports by mapping, each message to be transmitted and received via the one or more physical ports, at the transmission thereof to each virtual port via the end system.

13. The avionics data transfer system of claim 12, wherein associating one or more virtual ports of the at least a subset of virtual ports with one or more physical ports comprises associating the one or more virtual ports with one or more memory buffers or memory registers associated with the respective one or more physical ports.

14. The avionics data transfer system of claim 12, wherein the plurality of parameters that define the respective one or more physical ports comprise parameters associated with a virtual link, a sub-virtual link, a UDP source port, a UDP destination port, or a destination partition.

15. The avionics data transfer system of claim 12, wherein each virtual port of the at least a subset of virtual ports is allocated contiguously using a memory management unit.

16. The avionics data transfer system of claim 15, wherein access to the virtual ports by the one or more host computing devices is managed by the memory management unit.

17. An end system in an avionics data transfer system, the end system having one or more communication ports associated therewith, and configured to provide a communications interface between a host computing device and at least one switching device in the avionics data transfer system by:

defining a set of virtual ports for the end system wherein each virtual port of the set of virtual ports is associated with a corresponding communication port of the one or more communication ports;

mapping at least a subset of virtual ports in the set of virtual ports to a fixed definition in a memory space associated with the end system, such that the fixed definition in the memory space specifies one or more memory addresses associated with each virtual port of the subset of virtual ports;

associating one or more virtual ports of the at least a subset of virtual ports with one or more physical ports associated with the end system by specifying for the one or more virtual ports a plurality of port parameters used to communicate with the respective one or more physical ports and one or more buffers or registers required to interface with the respective one or more physical ports; and managing, via the one or more virtual ports, the one or more physical ports by mapping each message to be transmitted and received via the one or more physical ports at the transmission thereof to each virtual port via the end system.

18. The end system of claim 17, wherein the plurality of parameters that define the respective one or more physical ports comprise parameters associated with a virtual link, a sub-virtual link, a UDP source port, a UDP destination port, or a destination partition.

19. The end system of claim 17, wherein each virtual port of the at least a subset of virtual ports is allocated contiguously using a memory management unit.

20. The end system of claim 19, wherein access to the virtual ports by the one or more host computing devices is managed by the memory management unit.

* * * * *